US009512861B2

(12) United States Patent
Fugate et al.

(10) Patent No.: US 9,512,861 B2
(45) Date of Patent: Dec. 6, 2016

(54) COMPONENT MAINTENANCE ACTION IDENTIFICATION

(75) Inventors: David Fugate, East Hartford, CT (US); Frank E. Bullis, Hebron, CT (US); Christopher A. Johnson, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1297 days.

(21) Appl. No.: 12/975,399

(22) Filed: Dec. 22, 2010

(65) Prior Publication Data

US 2012/0161686 A1 Jun. 28, 2012

(51) Int. Cl.
*G05B 11/01* (2006.01)
*F15B 19/00* (2006.01)

(52) U.S. Cl.
CPC .................................. *F15B 19/005* (2013.01)

(58) Field of Classification Search
USPC ................ 318/135, 434, 432, 466, 626, 611, 638,318/563; 123/568.23; 60/773, 406, 403, 39.094, 60/39.281, 602; 700/45, 10; 137/100, 625.63, 137/625.64, 625.68, 85; 91/459, 426, 446, 464, 91/509; 702/183, 83, 140
See application file for complete search history.

(56) References Cited

U.S. PATENT DOCUMENTS

| | | | | |
|---|---|---|---|---|
| 4,576,198 | A | 3/1986 | Coakley | |
| 5,279,107 | A * | 1/1994 | Meisner et al. | 60/773 |
| 5,319,296 | A | 6/1994 | Patel | |
| 5,486,997 | A * | 1/1996 | Reismiller et al. | 700/45 |
| 5,867,986 | A * | 2/1999 | Buratti et al. | 60/602 |
| 6,012,437 | A * | 1/2000 | Radhamohan | F02D 21/08 123/568.23 |
| 7,000,893 | B2 | 2/2006 | Yakushi | |
| 2003/0117742 | A1* | 6/2003 | Koso et al. | 360/78.05 |
| 2007/0023093 | A1* | 2/2007 | Shelby et al. | 137/625.64 |
| 2008/0178827 | A1* | 7/2008 | Ervin | F01L 9/04 123/90.11 |
| 2009/0026985 | A1* | 1/2009 | Beyse | B60T 8/36 318/135 |
| 2009/0055130 | A1 | 2/2009 | Pandey et al. | |

FOREIGN PATENT DOCUMENTS

| | | |
|---|---|---|
| EP | 0786589 | 7/1997 |

OTHER PUBLICATIONS

European Search Report and Written Opinion for European Application No. EP 11 19 1949 completed on Feb. 4, 2014.

* cited by examiner

*Primary Examiner* — Jorge L Carrasquillo
(74) *Attorney, Agent, or Firm* — Carlson, Gaskey & Olds, P.C.

(57) ABSTRACT

An example method of initiating a maintenance action on a component includes monitoring an electrical current required to maintain a steady state position. The method then initiates a maintenance action on the component based on the monitored current.

16 Claims, 2 Drawing Sheets

COMPONENT MAINTENANCE ACTION IDENTIFICATION

This invention was made with government support under Contract Number N00019-02-C-3003 awarded by the NAVAIR/Joint Program Office. The Government has certain rights in this invention.

BACKGROUND

This disclosure relates generally to maintaining a component and, more particularly, to monitoring an electrical input current of a device to effectively time a maintenance action on the component.

Complex assemblies, such as turbomachines, include various individual components. Some of the individual components include portions that move in response to an applied electrical input current. Such movement is needed to move variable geometry blades within a turbomachine, for example.

An example component may include an electromechanical servovalve (EHSV) and an actuator. The null bias electrical current of the EHSV is the electrical current input that is needed to overcome the actuator null effect, or cause the actuator to maintain a steady state position. If the input current is larger than the null bias current, then the current will open the EHSV and port more fluid to the actuator, which drives the actuator to a desired extended position. Components are designed so that the current required to overcome the null bias and move the component to a desired position falls within a normal range of industry standards. A range of electrical input current is specified, rather than an exact value, because of build tolerances and other variables. The EHSV is typically biased to return to the home (or null) position when the current is not applied. Biasing the EHSV to the home position ensures that the EHSV is in a known position when no current is applied.

In this example, extending and retracting the actuator of the component moves the variable geometry blade within a turbomachine.

SUMMARY

An example method of initiating a maintenance action on a component includes monitoring an electrical current required to maintain a steady state position. The method then initiates a maintenance action on the component based on the monitored current.

An example component arrangement includes a component configured to move between a home position and an activated position. A controller is configured to monitor the null bias current required to control to the component. The controller initiates a maintenance action based on the null bias current.

An example turbomachine control assembly includes a component configured to move from a home position to an activated position when a current is applied to the component. At least one sensor is configured to monitor the actual input electrical current required to control the component. A controller initiates a maintenance action based on the null bias current required to control the component.

These and other features of the disclosed examples can be best understood from the following specification and drawings, the following of which is a brief description.

DETAILED DESCRIPTION

Figure 1:
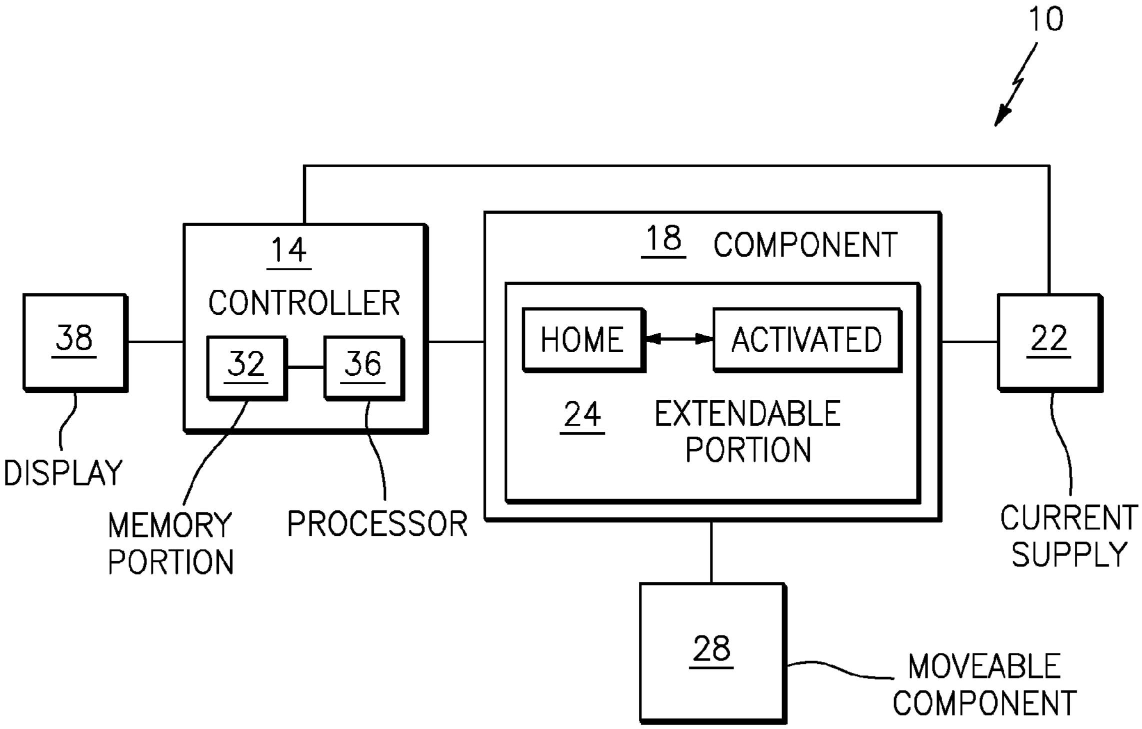
FIG. 1 shows a schematic view of an example component monitoring arrangement.

Referring to FIG. 1, an example component control arrangement 10 includes a controller 14, a component 18, and a current supply 22. The component 18 is a movable component activated by a current. The controller 14 controller supplies current to the component 18 from the current supply 22.

The controller 14 is configured to initiate movement of the component 18 from the home position to an activated position by commanding the current supply 22 to supply the component 18 with a 10 milliamp current, for example. In this example, the component 18 defaults to the home position when not supplied with a current.

The controller 14 is further configured to monitor the position of the component 18. The controller 14 can thus determine whether the commanded current resulted in the component 18 moving to the desired position. In one example, a sensor (not shown) is used to monitor the position of the component 18. A person having skill in this art would understand how to monitor the position of the component 18 using a sensor.

In this example, the component 18 includes an extendable portion 24. The home position corresponds to the portion 24 in a fully retracted position, and the activated position corresponds to the portion 24 at a partially extended position, such as a mid-travel position. The extension and retraction of the portion 24 moves a moveable component 28, such as a variable geometry blade within a turbomachine.

The example controller 14 includes a memory portion 32 and a processor 36. The memory portion 32 stores a program that is executed by the processor 36. The program enables the controller 14 to initiate and monitor the electrical input current provided to the component 18, and to monitor the position of the portion 24, the moveable, or both. The example controller 14 is also linked to a display 38, such as a computer monitor.

Many computing devices can be used to implement various functions described herein. For example, the controller 14 may include portions of a dual architecture micro server card. The memory portion 32 and the processor 36 also may include portions of a dual architecture micro server card.

In terms of hardware architecture, the controller 14 can additionally include one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as additional controllers, buffers (caches), drivers, repeaters, and receivers to enable communications. Further, the local interface may include address, control, and/or data connections to enable appropriate communications among the aforementioned components.

The example processor 36 used within the controller 14 executes software code, particularly software code stored in the memory portion 32. The processor 36 can be a custom made or commercially available processor, a central processing unit (CPU), an auxiliary processor among several processors associated with the computing device, a semiconductor based microprocessor (in the form of a microchip or chip set) or generally any device for executing software instructions.

The memory portion 32 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory portion 32 may include one or more additional or separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Figure 2:
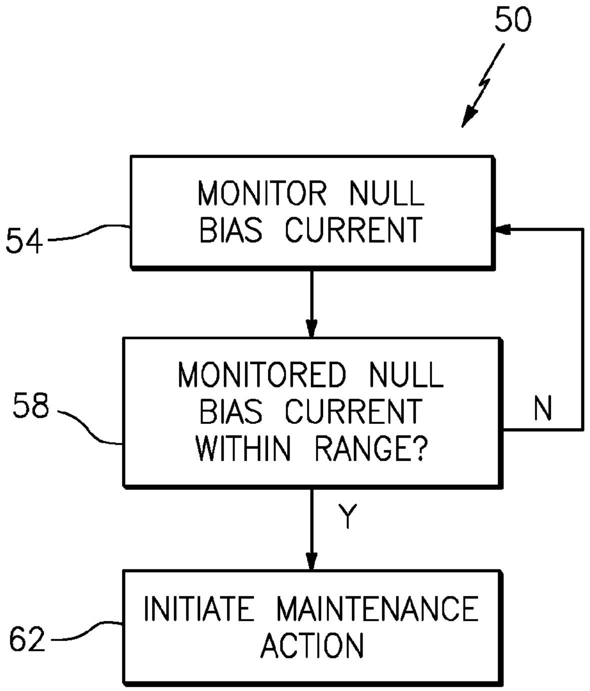
FIG. 2 shows the flow of an example method used by a controller of the FIG. 1 arrangement.

Referring now to FIG. 2 with continuing reference to FIG. 1, an example program 50, or method, executed by the processor 36 includes a step 54. The step 54 monitors the current required to maintain a steady state position (null bias current) of the component 18. This current is typically referred to as the null bias current.

The program 50 then determines if the monitored null bias current is within a desired acceptable range at a step 58. The desired range of null bias current is stored in the memory portion 32 in this example. If the monitored null bias current is within the desired range of currents, the method returns to the step 54 and continues monitoring.

If the monitored null bias current is not within the desired range, program 50 initiates a maintenance action at a step 62. The step 62 may include initiating a visual cue on the display 38 linked to the controller 14. For example, the display 38 may show the name of the component 18 and a description that the component 18 needs to be inspected, repaired, or replaced. Industry experience indicates that this condition is due to component wear and fatigue over it life. The maintenance actions are typically actions performed on the component when the component 18 is not operating in an acceptable manner. Various types of maintenance actions could be displayed. The maintenance actions may depend on the type of component 18.

The example program 50 initiates the maintenance action at the step 62 based on the step 58. That is, initiating the maintenance action is based on a monitored null bias current that is not within the acceptable range.

In another example, initiating the maintenance action is based on a monitored null bias current that is trending downward or upward beyond typical operating values. For example, if the monitored current increases over time from 10 milliamps, to 11 milliamps, to 12 milliamps, etc., a maintenance action is initiated. Such an approach may be useful to identify a component that is gradually failing.

Figure 3A:
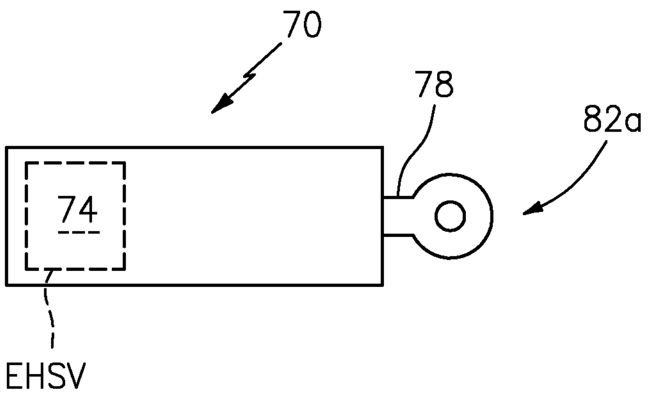
FIG. 3A shows a side view of an example component having a rod in a home position.
Figure 3B:
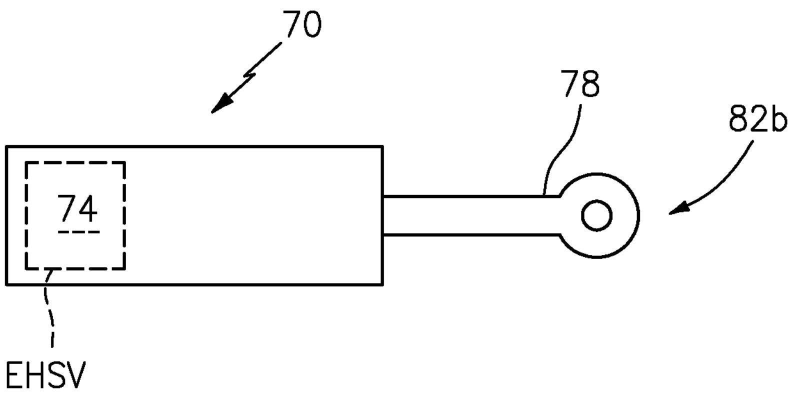
FIG. 3B shows a side view of the FIG. 3A component having the rod in an activated position.

Referring to FIGS. 3A and 3B, an example component assembly 70 includes an electromechanical servo valve (EHSV) 74 configured to initiate movement of a rod 78 between a home position **82*a* and an activated position 82*b*. Moving the rod 78 moves a variable geometry blade (not shown) within a turbomachine, such as a gas turbine engine. The activated position 82*b* represents a desired position of the rod 78**, such as a mid-travel position.

Supplying the assembly 70 with sufficient current allows more flow through the EHSV 74, which causes the rod 78 to extend to the desired position. The input current to holds the rod 78 in the desired position is called the null bias current. The assembly 70 is designed so that the input electrical current required to hold the rod 78 a desired position will fall between 8 and 12 milliamps.

In this example, however, the assembly 70 actually requires a 14 milliamps current to hold the rod 78 in the desired position. A degradation in the assembly 70 may be the cause of the increased null bias current.

As can be appreciated, the actual null bias current of 14 milliamps is outside the acceptable range of null bias currents. Thus, the program 50 (FIG. 2), would initiate a maintenance action, such as an inspection of the assembly 70. The inspection takes place before the assembly 70 experiences a mechanical failure.

Features of the disclosed examples include identifying potential maintenance issues within movable components based on currents supplied to the components. A mechanical failure is thus not required before a maintenance activity is required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of initiating a maintenance action on a component, comprising:

monitoring an electrical input current required to hold a component in a steady state position; and initiating a maintenance action on the component based on the monitored current when the monitored current trends higher or trends lower.

2. The method of claim 1, including initiating the maintenance action when the monitored current is more than or less than an acceptable range of currents.

3. The method of claim 2, wherein the acceptable range of currents is 8 milliamps to 12 milliamps.

4. The method of claim 1, wherein the electrical input current is a null bias current.

5. The method of claim 1, wherein the component is an electromechanical servovalve.

6. The method of claim 1, wherein the initiating is based on the monitored current that is outside an acceptable range for operation.

7. A component arrangement, comprising:

a component configured to move between a home position and an activated position; and a controller configured to monitor an electrical input current that is provided to the component, and to initiate a maintenance action based on the electrical input current required to hold the component in the activated position trends higher or trends lower, wherein the electrical input current is a null bias current.

8. The component arrangement of claim 7, wherein the controller is configured to initiate the maintenance action when the monitored current is more than or less than an acceptable range of currents.

9. The component arrangement of claim 8, wherein the acceptable range of currents is 8 milliamps to 12 milliamps.

10. The component arrangement of claim 7, wherein the component is an electromechanical servovalve.

11. A turbomachine control assembly, comprising:

a component configured to move from an home position to an activated position when a current is applied to the component;

at least one sensor configured to monitor an actual electrical input current that holds the component in a steady-state position; and a controller that initiates a maintenance action when the actual input electrical current required to hold the component at a steady state position trends higher or trends lower.

12. The turbomachine control assembly of claim 11, wherein the component is an electromechanical servovalve.

13. The turbomachine control assembly of claim 12, wherein the electromechanical servovalve is configured to actuate a variable geometry blade.

14. The turbomachine control assembly of claim 11, including initiating the maintenance action when the current required to hold the component at a steady state position is outside the acceptable range for control of the component.

15. The turbomachine control assembly of claim 11, wherein the component is an aircraft gas turbine engine component, and the maintenance action is an action performed when the aircraft gas turbine engine component is not in flight.

16. A method of initiating a maintenance action on a component, comprising:

monitoring an electrical input current required to hold a component in a steady state position; and initiating a maintenance action on the component based on the monitored current; and performing the maintenance action on the component based on the monitored current.

* * * * *